United States Patent
Kawamoto et al.

(10) Patent No.: US 11,522,199 B2
(45) Date of Patent: Dec. 6, 2022

(54) NON-AQUEOUS ELECTROLYTE SECONDARY BATTERY

(71) Applicant: TOYOTA JIDOSHA KABUSHIKI KAISHA, Toyota (JP)

(72) Inventors: Jun Kawamoto, Toyota (JP); Tatsuya Hattori, Ichinomiya (JP); Kenichi Maehara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 287 days.

(21) Appl. No.: 16/940,548

(22) Filed: Jul. 28, 2020

(65) Prior Publication Data

US 2021/0036332 A1 Feb. 4, 2021

(30) Foreign Application Priority Data

Aug. 1, 2019 (JP) .............. JP2019-142340

(51) Int. Cl.
| | |
|---|---|
| *H01M 4/66* | (2006.01) |
| *H01M 4/62* | (2006.01) |
| *H01M 10/0525* | (2010.01) |
| *H01M 4/36* | (2006.01) |
| *H01M 4/02* | (2006.01) |

(52) U.S. Cl.
CPC ......... *H01M 4/667* (2013.01); *H01M 4/366* (2013.01); *H01M 4/626* (2013.01); *H01M 10/0525* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | |
|---|---|---|
| 2012/0058375 A1 | 3/2012 | Tanaka et al. |
| 2013/0048340 A1 | 2/2013 | Bando et al. |
| 2020/0067081 A1 | 2/2020 | Hirai et al. |

FOREIGN PATENT DOCUMENTS

| | | |
|---|---|---|
| JP | 2012-74359 A | 4/2012 |
| JP | 2015-213073 A | 11/2015 |
| JP | 2017-157471 A | 9/2017 |
| KR | 10-2013-0024766 A | 3/2013 |
| WO | 2018/079817 A1 | 5/2018 |

*Primary Examiner* — Anca Eoff
(74) *Attorney, Agent, or Firm* — Sughrue Mion, PLLC (57) ABSTRACT

According to an aspect of the present invention, provided is a non-aqueous electrolyte secondary battery including a positive electrode, a negative electrode, and a non-aqueous electrolyte. The positive electrode includes a positive electrode current collector, a positive electrode active material layer which is formed on the positive electrode current collector except for an exposed part of the positive electrode current collector, and an inorganic filler layer formed at a boundary part between the exposed part of the positive electrode current collector and the positive electrode active material layer. A stacking part in which the inorganic filler layer is overlaid with the positive electrode active material layer is formed at the boundary part, and an end surface of the positive electrode active material layer closer to the boundary part is covered with the inorganic filler layer.

8 Claims, 6 Drawing Sheets

NON-AQUEOUS ELECTROLYTE SECONDARY BATTERY

CROSS REFERENCE TO RELATED APPLICATION

This application claims the benefit of priority to Japanese Patent Application No. 2019-142340 filed on Aug. 1, 2019. The entire contents of this application are hereby incorporated herein by reference.

BACKGROUND OF THE DISCLOSURE

1. Field

The present invention relates to a non-aqueous electrolyte secondary battery.

2. Background

Generally, a non-aqueous electrolyte secondary battery includes a positive electrode having a positive electrode active material layer, a negative electrode which faces the positive electrode and has a negative electrode active material layer wider than the positive electrode active material layer, and a non-aqueous electrolyte containing charge carriers. The positive electrode of the non-aqueous electrolyte secondary battery includes a positive electrode current collector and the positive electrode active material layer provided on the positive electrode current collector. For example, in order to collect electricity, the positive electrode current collector may have a part in which no positive electrode active material layer is provided and the positive electrode current collector is exposed (an exposed part of the positive electrode current collector) at at least one end. In connection with this, Japanese Patent Application Publication No. 2015-213073 discloses a positive electrode including a positive electrode current collector, a positive electrode active material layer which has a tapered end area whose thickness gradually decreases and is provided on the positive electrode current collector except for an exposed part of the positive electrode current collector, and an alumina-containing layer which extends from the exposed part of the positive electrode current collector and is provided to be overlaid on a part of the end area.

SUMMARY

However, according to studies by the inventors, in the configuration, there is a tendency that metal deposition easily occurs on the negative electrode. That is, as described above, when the negative electrode active material layer is wider than the positive electrode active material layer and an end area with a small thickness is in contact with the positive electrode current collector, a current and charge carriers are likely to concentrate in the end area. However, during charging and discharging, generally, a battery voltage is controlled by a difference between a potential of the entire positive electrode and a potential of the entire negative electrode, that is, an average value. Therefore, the end area of the positive electrode active material layer is more likely to be exposed to a higher potential than other areas. Therefore, when charging and discharging are repeated, metallic elements (for example, charge carriers and a transition metal element constituting a positive electrode active material) are easily eluted from the end area of the positive electrode. As a result, for example, in a mode in which high rate charging and discharging are repeated, metal deposition (for example, Li deposition) may occur on the facing negative electrode.

The present invention has been made in view of the above circumstances, and an object of the present invention is to provide a non-aqueous electrolyte secondary battery in which the occurrence of metal deposition on a negative electrode is minimized.

According to the present invention, provided is a non-aqueous electrolyte secondary battery including a positive electrode, a negative electrode that faces the positive electrode, and a non-aqueous electrolyte. The positive electrode includes a positive electrode current collector, a positive electrode active material layer which contains a positive electrode active material and is formed on the positive electrode current collector except for a part in which the positive electrode current collector is exposed, and an inorganic filler layer which contains an inorganic filler and is formed at a boundary part between the part in which the positive electrode current collector is exposed and the positive electrode active material layer. A stacking part in which the inorganic filler layer is overlaid with the positive electrode active material layer is formed at the boundary part, and an end surface of the positive electrode active material layer closer to the boundary part is covered with the inorganic filler layer.

In the configuration, the inorganic filler layer is overlaid with the positive electrode active material layer at the boundary part. In other words, in a cross-sectional view, the inorganic filler layer is interposed between the positive electrode active material layer and the positive electrode current collector. In addition, an end surface of the positive electrode active material layer closer to the boundary part is covered with the inorganic filler layer. This minimizes supply of electrons from the positive electrode current collector to the end of the positive electrode active material layer. In addition, a charging and discharging reaction on the end surface of the positive electrode active material layer is minimized. As a result, in the stacking part, the positive electrode active material layer is less likely to be exposed to a high potential, and it is possible to minimize elution of metallic elements from the positive electrode active material. Therefore, it is possible to reduce metal deposition on the negative electrode.

In one preferable aspect of the non-aqueous electrolyte secondary battery disclosed here, the positive electrode active material layer includes a first area fixed to a surface of the positive electrode current collector and a second area which extends from the first area and is fixed to a surface of the inorganic filler layer. In the stacking part, the inorganic filler layer has an inclined surface such that the inorganic filler layer has a thickness continuously decreasing toward the first area. According to such a configuration, it is possible to effectively minimize elution of metallic elements in the stacking part.

In one preferable aspect of the non-aqueous electrolyte secondary battery disclosed here, an inclination angle of the inclined surface with respect to the positive electrode current collector is 5° or more and 50° or less. According to such a configuration, it is possible to effectively minimize elution of metallic elements in the stacking part. In addition, it is possible to stably laminate the second area on the inclined surface.

In one preferable aspect of the non-aqueous electrolyte secondary battery disclosed here, the stacking part has a width of 500 μm or less in a direction from the positive electrode active material layer toward the inorganic filler layer. According to such a configuration, it is possible to effectively minimize elution of metallic elements in the stacking part and also it is possible to suitably realize a large battery capacity.

In one preferable aspect of the non-aqueous electrolyte secondary battery disclosed here, a surface of a part of the stacking part facing the negative electrode is formed to be flat. According to such a configuration, it is possible to make a distance between facing positive and negative electrodes in the stacking part uniform. Thereby, it is possible to minimize variation in the charging and discharging reaction.

In one preferable aspect of the non-aqueous electrolyte secondary battery disclosed here, the inorganic filler layer includes a first part which is overlaid with the positive electrode active material layer and a second part which is provided closer to the part in which the positive electrode current collector is exposed than the first part and which is not overlaid with the positive electrode active material layer. In a plan view, the second part protrudes from the negative electrode. According to such a configuration, for example, even if the active material layer expands or contracts when the electrode body is produced or when high rate charging and discharging are performed or the like, it is possible to suitably minimize fine short circuiting between positive and negative electrodes.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, some embodiments of the technology disclosed here will be described. Here, of course, the embodiments described here are not intended to limit the technology disclosed here. Components other than those particularly mentioned in this specification that are necessary for implementing the technology disclosed here (for example, a general configuration and a production process of a non-aqueous electrolyte secondary battery that does not characterize the technology disclosed here) can be recognized by those skilled in the art as design matters based on the related art in the field. The technology disclosed here can be implemented based on content disclosed in this specification and common general technical knowledge in the field.

Here, in this specification, "secondary battery" generally refers to a power storage device that can be repeatedly charged and discharged. For example, a lithium ion secondary battery, a nickel metal hydride battery, a lithium ion capacitor, an electric double layer capacitor, and the like are typical examples included in the secondary battery here. In addition, in this specification, "lithium ion secondary battery" refers to a secondary battery in which lithium ions are used as charge carriers, and charging and discharging are realized when lithium ions move between positive and negative electrodes. Here, in this specification, the notation "A to B" (A and B are any numerical values) indicating a range means "A or more and B or less" and also "preferably larger than A" and "preferably smaller than B."

Although not intended as a particular limitation, a lithium ion secondary battery will be exemplified in detail below. In the following drawings, members and portions having the same functions are denoted by the same reference numerals, and redundant descriptions thereof will be omitted or simplified. In addition, symbols X and Y in the drawings represent a thickness direction and a width direction of an electrode body. Symbols X and Y intersect (orthogonal here) each other in a plan view. The width direction Y is an example of a direction from a positive electrode active material layer to an inorganic filler layer. In addition, along the width direction Y, one direction may be referred to as a Y1 direction (right direction), and the opposite direction may be referred to as a Y2 direction (left direction). However, these directions are only directions determined for convenience of description and do not limit an installation form of a lithium ion secondary battery at all.

Figure 1:
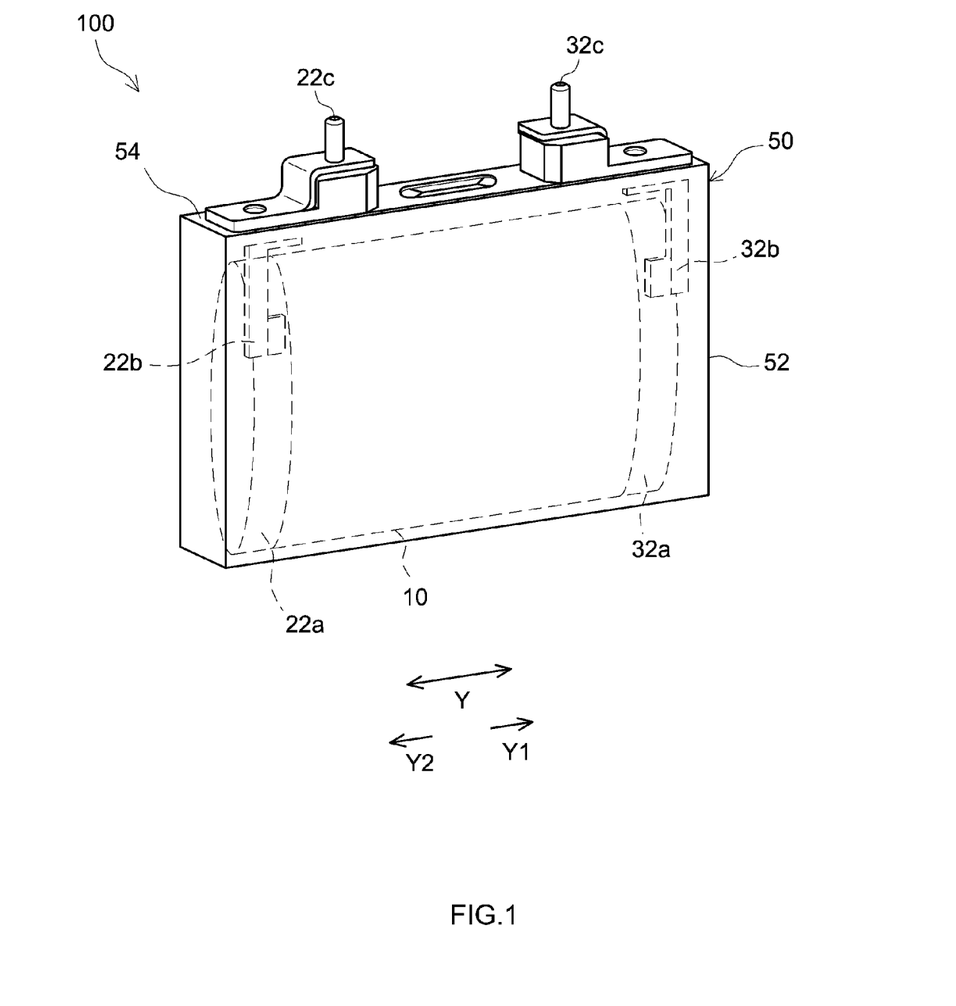
FIG. 1 is a perspective view showing a lithium ion secondary battery according to an embodiment of the present invention.

FIG. 1 is a perspective view schematically showing a lithium ion secondary battery 100. The lithium ion secondary battery 100 includes a flat wound electrode body 10 (refer to FIG. 2), a non-aqueous electrolyte (not shown), and a flat rectangular battery case 50. The battery case 50 is an exterior container in which the wound electrode body 10 and the non-aqueous electrolyte are accommodated. Regarding the material of the battery case 50, for example, a lightweight metal material having favorable thermal conductivity such as aluminum is suitable. The battery case 50 includes a case main body 52 having a bottomed rectangular parallelepiped shape having an opening and a lid (sealing plate) 54 that closes the opening. The lid 54 is a rectangular plate member. A positive electrode terminal 22c and a negative electrode terminal 32c for external connection protrude upward from the lid 54.

Figure 2:
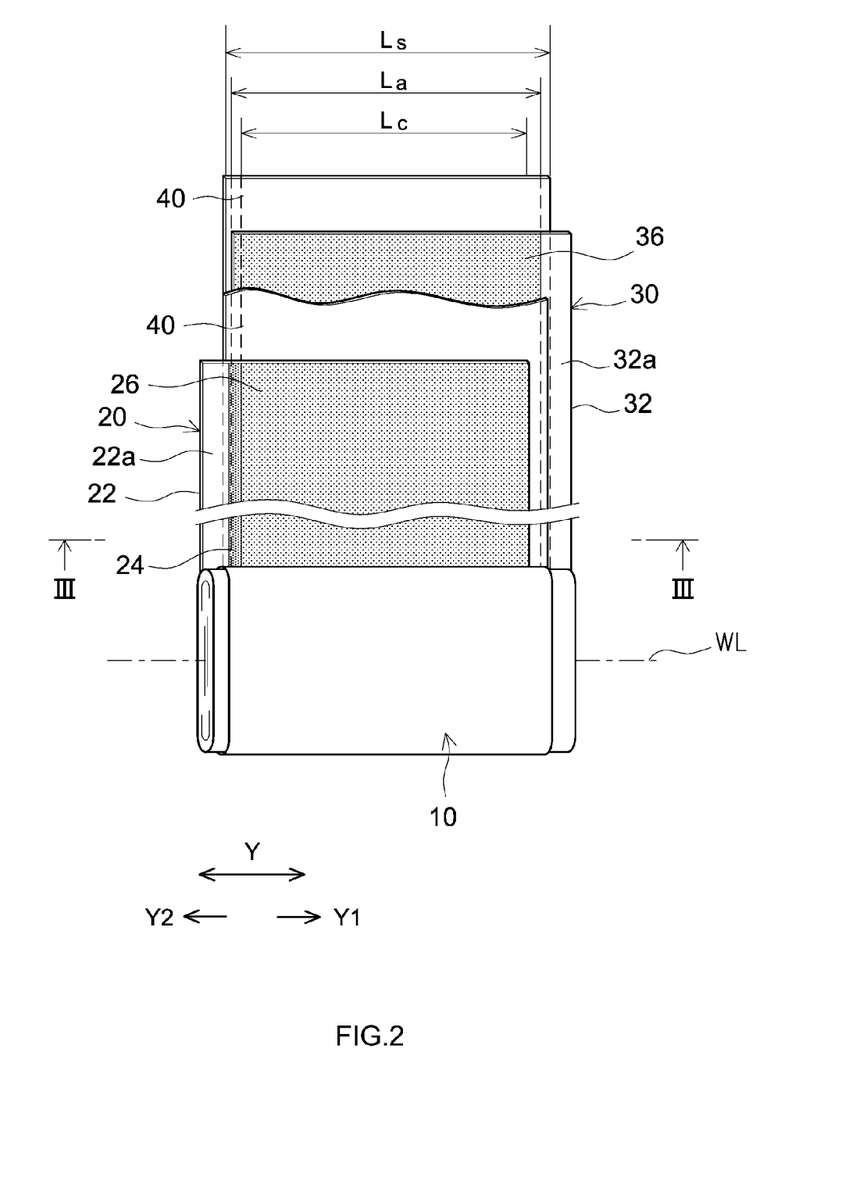
FIG. 2 is a schematic view showing a configuration of a wound electrode body.
Figure 3:
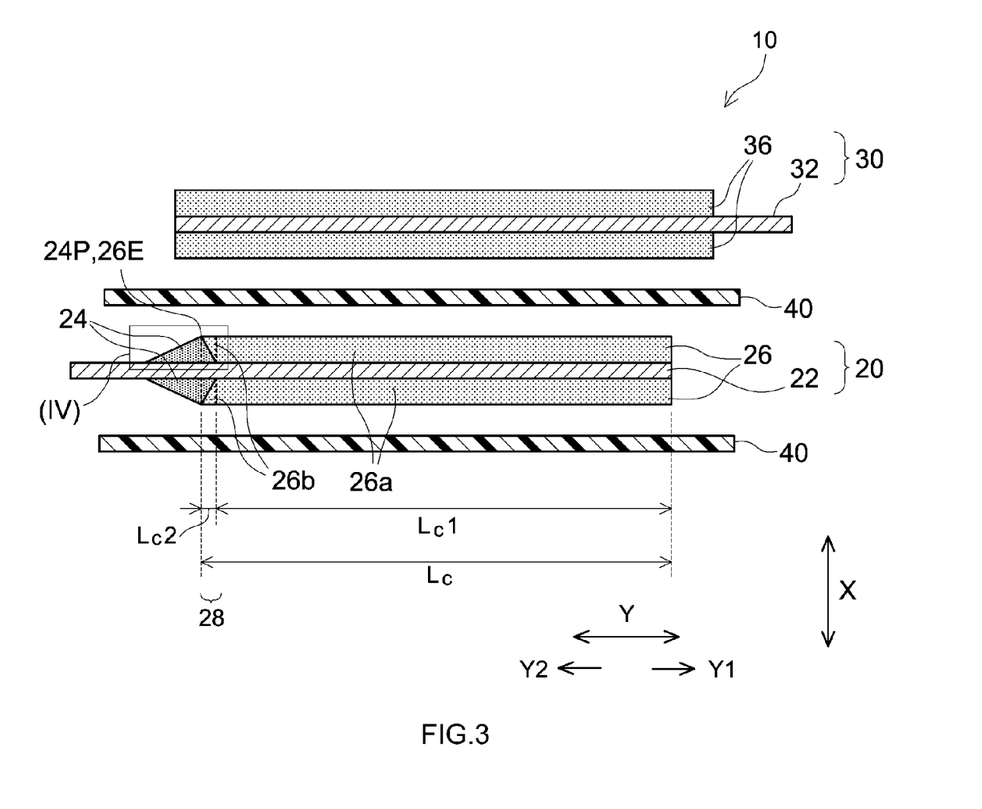
FIG. 3 is a cross-sectional view taken along the line (III)-(III) in FIG. 2.

FIG. 2 is a schematic view showing the wound electrode body 10. FIG. 3 is a cross-sectional view taken along the line (III)-(III) in the wound electrode body 10. As shown in FIG. 2, the wound electrode body 10 has a configuration in which a band-like positive electrode 20 and a band-like negative electrode 30 are laminated with a band-like separator 40 therebetween, and wound in a longitudinal direction about a winding axis WL. The wound electrode body 10 has a flat shape and has an elliptical shape in a cross section in the width direction Y.

The positive electrode 20 includes a positive electrode current collector 22, an inorganic filler layer 24 formed on the positive electrode current collector 22, and a positive electrode active material layer 26 formed on the positive electrode current collector 22. The positive electrode current collector 22 is a conductive member. Regarding the positive electrode current collector 22, for example, a metal foil of aluminum, nickel, or the like is suitable. Here, the positive electrode current collector 22 may be subjected to a conventionally known surface treatment, for example, an etching treatment or a hydrophilic treatment. The positive electrode current collector 22 has a part 22a in which the inorganic filler layer 24 and the positive electrode active material layer 26 are not formed and the positive electrode current collector 22 is exposed (hereinafter referred to as an "exposed part of the positive electrode current collector"). Here, the exposed part 22a of the positive electrode current collector is provided in a band shape at an end of the positive electrode current collector 22 in the Y2 direction. However, the exposed part 22a of the positive electrode current collector may be provided at an end in the Y1 direction, or may be provided at both ends in the width direction Y. As shown in FIG. 2, the exposed part 22a of the positive electrode current collector protrudes in the Y2 direction relative to the end of the separator 40 in the Y2 direction in a plan view. As shown in FIG. 1, a positive electrode current collecting plate 22b is bonded to the exposed part 22a of the positive electrode current collector. The positive electrode current collecting plate 22b is electrically connected to the positive electrode terminal 22c.

The inorganic filler layer 24 is a layer (high resistance layer) having higher electrical resistance than the positive electrode active material layer 26. The inorganic filler layer 24 contains an inorganic filler. The inorganic filler layer 24 is typically insulating. Examples of inorganic fillers include an oxide such as alumina, magnesia, silica, and titania, a clay mineral such as boehmite, mullite, mica, talc, zeolite, apatite, and kaolin, and quartz glass. These can be used alone or two or more thereof can be used in combination. Among them, alumina is preferable because of its high heat resistant temperature. In addition, relatively soft boehmite is preferable in order to reduce wear of a coating device. The inorganic filler may be in the form of core-shell particles in which a lithium ion conductive inorganic material, for example, lithium phosphate, is attached to at least a part of the surface. When the total solid content of the inorganic filler layer 24 is set as 100 mass %, a proportion of the inorganic filler may be about 50 mass % or more, for example, 80 mass % or more.

The inorganic filler layer 24 may contain optional components other than the inorganic filler, for example, a binder, lithium phosphate, and various additive components. Regarding the binder, for example, a polyolefin binder such as polyethylene (PE), polyvinylidene fluoride (PVdF), polytetrafluoroethylene (PTFE), an acrylic resin, styrene butadiene rubber (SBR), or the like can be used.

As shown in FIG. 2, the inorganic filler layer 24 is positioned in the Y2 direction relative to the positive electrode active material layer 26. The inorganic filler layer 24 is formed in a band shape along an end of the positive electrode active material layer 26 in the Y2 direction. The inorganic filler layer 24 extends in the longitudinal direction with a predetermined width Lh (refer to FIG. 4). The inorganic filler layer 24 protrudes in the Y2 direction relative to an end of the negative electrode 30 in the Y2 direction in a plan view. The entire inorganic filler layer 24 is overlaid on the separator 40 in a plan view.

The positive electrode active material layer 26 contains a positive electrode active material that can reversibly occlude and release charge carriers. Examples of positive electrode active materials include lithium transition metal oxides such as a lithium- and nickel-containing composite oxide, a lithium- and cobalt-containing composite oxide, a lithium-, nickel- and cobalt-containing composite oxide, a lithium- and manganese-containing composite oxide, and a lithium-, nickel-, cobalt- and manganese-containing composite oxide. These can be used alone or two or more thereof can be used in combination. Among these, a lithium-, nickel-, cobalt- and manganese-containing composite oxide having a layered rock salt type structure is preferable. When the total solid content of the positive electrode active material layer 26 is set as 100 mass %, a proportion of the positive electrode active material may be about 50 mass % or more, for example, 80 mass % or more.

The positive electrode active material layer 26 may contain optional components other than the positive electrode active material, for example, a conductive material, a dispersant, a binder, lithium phosphate, and various additive components. Regarding the conductive material, for example, carbon black such as acetylene black (AB) and other carbon materials can be used. The binder may be of the same type as or a different type from the binder of the inorganic filler layer 24. Regarding the binder, for example, polyvinylidene fluoride (PVdF) can be used. In addition, when the inorganic filler of the inorganic filler layer 24 has the form of core-shell particles, the positive electrode active material layer 26 preferably contains lithium phosphate.

As shown in FIG. 2, the positive electrode active material layer 26 is positioned in the Y1 direction relative to the inorganic filler layer 24. The positive electrode active material layer 26 is formed in a band shape along an end of the positive electrode current collector 22 in the Y1 direction. The positive electrode active material layer 26 extends in the longitudinal direction with a predetermined width Lc. The entire positive electrode active material layer 26 is overlaid on a negative electrode active material layer 36 in a plan view. The entire positive electrode active material layer 26 is overlaid on the separator 40 in a plan view. As shown in FIG. 3, the positive electrode active material layer 26 includes a first area 26a and a second area 26b which is provided closer to the exposed part 22a of the positive electrode current collector than the first area 26a and includes an end 26E of the positive electrode active material layer 26 in the Y2 direction.

The negative electrode 30 includes a negative electrode current collector 32 and the negative electrode active material layer 36 formed on the negative electrode current collector 32. The negative electrode current collector 32 is a conductive member. Regarding the negative electrode current collector 32, for example, a metal foil such as copper or nickel is suitable. The negative electrode current collector 32 has a part 32a in which the negative electrode active material layer 36 is not formed and the negative electrode current collector 32 is exposed (an exposed part of the negative electrode current collector). Here, the exposed part 32a of the negative electrode current collector is provided in a band shape at an end of the negative electrode current collector 32 in the Y1 direction. As shown in FIG. 2, the exposed part 32a of the negative electrode current collector protrudes in the Y1 direction relative to an end of the separator 40 in the Y1 direction in a plan view. As shown in FIG. 1, a negative electrode current collecting plate 32b is bonded to the exposed part 32a of the negative electrode current collector. The negative electrode current collecting plate 32b is electrically connected to the negative electrode terminal 32c.

The negative electrode active material layer 36 is fixed to the surface of the negative electrode current collector 32. The negative electrode active material layer 36 contains a negative electrode active material that can reversibly occlude and release charge carriers. Examples of negative electrode active materials include carbon materials such as graphite, metal oxide materials such as titanium oxide, and lithium titanium composite oxide (LTO), and Si materials containing silicon. These can be used alone or two or more thereof can be used in combination. The negative electrode active material layer 36 may contain optional components other than the negative electrode active material, for example, a conductive material, a binder, and a thickener. Regarding the conductive material, for example, carbon black such as acetylene black (AB) and other carbon materials can be suitably used. Regarding the binder, for example, styrene butadiene rubber (SBR) can be used. Regarding the thickener, for example, carboxymethyl cellulose (CMC) can be used.

As shown in FIG. 2 the negative electrode active material layer 36 extends in the longitudinal direction with a predetermined width La. The width La of the negative electrode active material layer 36 is wider than the width Lc of the positive electrode active material layer 26. That is, La>Lc. The negative electrode active material layer 36 protrudes in the Y1 direction relative to an end of the positive electrode active material layer 26 in the Y1 direction in a plan view. The negative electrode active material layer 36 protrudes in the Y2 direction relative to an end of the positive electrode active material layer 26 in the Y2 direction in a plan view.

The separator 40 insulates the positive electrode active material layer 26 of the positive electrode 20 from the negative electrode active material layer 36 of the negative electrode 30. Regarding the separator 40, for example, a porous resin sheet made of a resin such as polyethylene (PE), polypropylene (PP), a polyester, cellulose, or a polyamide, is suitable. The separator 40 may have a single-layer structure, or may have a structure in which two or more layers are laminated, for example, a three-layer structure in which a PP layer is laminated on both surfaces of a PE layer. For example, a heat resistant layer (HRL) containing the inorganic filler as a material constituting the inorganic filler layer 24 may be provided on the surface of the separator 40.

As shown in FIG. 2, the width Ls of the separator 40 is wider than the width Lc of the positive electrode active material layer 26 and the width La of the negative electrode active material layer 36. That is, Ls>La>Lc. The separator 40 protrudes in the Y1 direction relative to an end of the positive electrode active material layer 26 in the Y1 direction and an end of the negative electrode active material layer 36 in the Y1 direction in a plan view. The separator 40 protrudes in the Y2 direction relative to an end of the inorganic filler layer 24 in the Y2 direction, an end of the positive electrode active material layer 26 in the Y2 direction, and an end of the negative electrode active material layer 36 in the Y2 direction in a plan view.

The non-aqueous electrolyte is, for example, a non-aqueous electrolytic solution containing a non-aqueous solvent and a supporting salt. Regarding the non-aqueous solvent, organic solvents such as various carbonates, ethers, and esters can be used. Among these, carbonates are preferable. Specific examples include ethylene carbonate (EC), propylene carbonate (PC), diethyl carbonate (DEC), dimethyl carbonate (DMC), ethyl methyl carbonate (EMC), monofluoroethylene carbonate (MFEC), and difluoroethylene carbonate (DFEC). These non-aqueous solvents can be used alone or two or more thereof can be used in an appropriate combination. Regarding the supporting salt, for example, a lithium salt such as $LiPF_6$ and $LiBF_4$ can be used. The non-aqueous electrolyte may additionally contain various conventionally known additives, for example, over-charge additives such as biphenyl (BP) and cyclohexylbenzene (CHB), an oxalato complex compound containing boron atoms and/or phosphorus atoms, and a film forming agent such as vinylene carbonate (VC).

Here, as shown in FIG. 3, in the positive electrode 20, the inorganic filler layer 24 is fixed to the surface of the positive electrode current collector 22. The inorganic filler layer 24 is positioned at the boundary part between the positive electrode active material layer 26 and the exposed part 22a of the positive electrode current collector in the width direction Y. Specifically, the inorganic filler layer 24 is positioned between the first area 26a of the positive electrode active material layer 26 and the exposed part 22a of the positive electrode current collector. The cross section of the inorganic filler layer 24 is substantially triangular.

Figure 4:
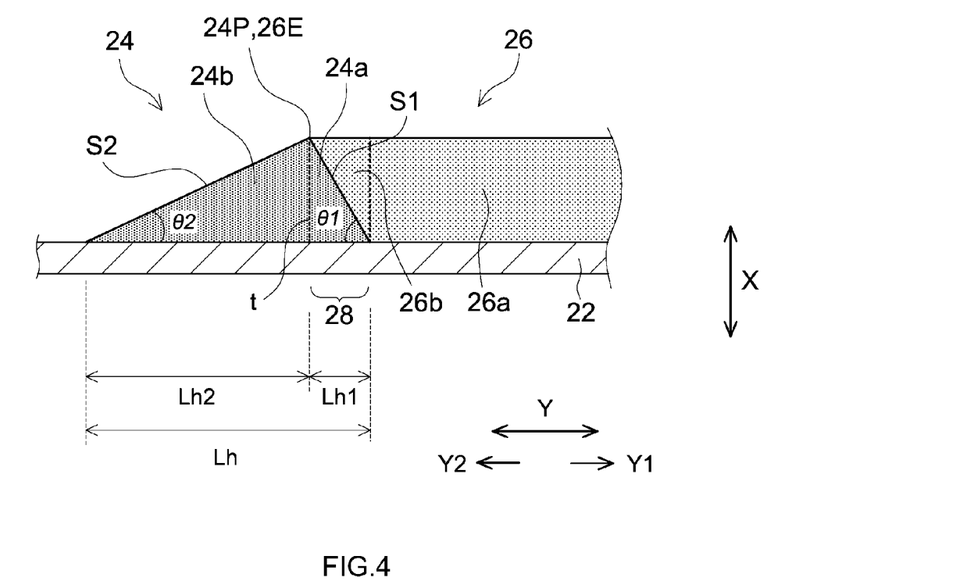
FIG. 4 is an enlarged view of an inorganic filler layer in FIG. 3 and its periphery.

FIG. 4 is an enlarged view of the inorganic filler layer 24 and its periphery. As shown in FIG. 4, the inorganic filler layer 24 includes the thickest vertex 24P, a first tapered part 24a whose thickness continuously decreases in the Y1 direction from the vertex 24P, and a second tapered part 24b whose thickness continuously decreases in the Y2 direction from the vertex 24P. The first tapered part 24a is an example of a "first part" in the present embodiment, and the second tapered part 24b is an example of a "second part" in the present embodiment. The first tapered part 24a and the second tapered part 24b each have a substantially triangular cross section. Here, the second tapered part 24b is not essential and can be omitted in other embodiments.

The vertex 24P is positioned in the Y1 direction (the side of the positive electrode active material layer 26) relative to an end of the negative electrode 30 (for example, the negative electrode active material layer 36) in the Y2 direction in a plan view. The vertex 24P is positioned in the Y1 direction about 0.1 to 10 mm, for example, 0.5 to 5 mm, or 1 to 2 mm, from an end of the negative electrode 30 (for example, the negative electrode active material layer 36) in the Y2 direction. In the width direction Y, here, the position of the vertex 24P is substantially the same as the position of the end 26E of the positive electrode active material layer 26 (production errors and the like are acceptable).

The first tapered part 24a is in contact with the positive electrode active material layer 26. As shown in FIG. 3, the first tapered part 24a overlaps the negative electrode active material layer 36 in a plan view. As shown in FIG. 4, the second area 26b of the positive electrode active material layer 26 is laminated on the first tapered part 24a. The surface of the first tapered part 24a is covered with the second area 26b. Although not particularly limited, the width Lh1 of the first tapered part 24a may be about 10 μm or more, typically 20 to 10,000 μm, for example, 30 to 5,000 μm, and preferably 50 to 1,000 μm, for example, 50 to 500 μm. Although not particularly limited, the maximum thickness t (the thickness at the vertex 24P) of the first tapered part 24a may be about 10 to 200 μm, typically 20 to 150 μm, for example, 40 to 100 μm. The maximum thickness t may be the same as the average thickness of the first area 26a of the positive electrode active material layer 26 (production errors and the like are acceptable).

In a cross-sectional view, the thickness of the first tapered part 24a decreases toward the Y1 direction (toward the end of the positive electrode current collector 22 in the Y1 direction). The first tapered part 24a has an inclined surface S1 in which the degree of inclination is substantially constant. The inclined surface S1 is an example of the "inclined surface" in the present embodiment. An angle (inclination angle) θ1 formed by the inclined surface S1 and the positive electrode current collector 22 may be $0°<θ1<90°$, typically $1°≤θ1≤80°$, $3°≤θ1≤60°$, preferably $5°≤θ1≤50°$, for example, $5°≤θ1≤30°$. θ1 may be 10° or more, or 20° or less. Thereby, it is possible to effectively minimize elution of metallic elements from the second area 26b. In addition, it is possible to stably laminate the second area 26b. In addition, a large battery capacity can be provided. Here, a method of determining an inclination angle will be described in the section of examples.

The second tapered part 24b extends in the Y2 direction from the first tapered part 24a. The second tapered part 24b is provided in the Y2 direction relative to the first tapered part 24a. As can be seen from FIG. 3 and FIG. 4, the second tapered part 24b protrudes in the Y2 direction relative to an end of the negative electrode active material layer 36 in the Y2 direction in a plan view. As shown in FIG. 4, here, no other layers such as the positive electrode active material layer 26 are laminated on the second tapered part 24b. The second tapered part 24b is exposed in a plan view. The width Lh2 of the second tapered part 24b protrudes in the Y2 direction relative to an end of the negative electrode 30 in the Y2 direction in a plan view. Here, the width Lh2 of the second tapered part 24b is longer than the width Lh1 of the first tapered part 24a. However, the width Lh2 may be the same as the width Lh1 of the first tapered part 24a and may be shorter than the width Lh1 of the first tapered part 24a.

In a cross-sectional view, the thickness of the second tapered part 24b decreases toward the Y2 direction (toward the end of the positive electrode current collector 22 in the Y2 direction). The second tapered part 24b has an inclined surface S2 in which the degree of inclination is substantially constant. Here, an angle (inclination angle) θ2 formed by the inclined surface S2 and the positive electrode current collector 22 is θ2≤θ1. However, θ2>θ1 may be satisfied. The angle θ2 may be typically $1° \leq θ2 \leq 60°$, preferably $3° \leq θ2 \leq 45°$, for example, $5° \leq θ2 \leq 30°$.

As shown in FIG. 3, the positive electrode active material layer 26 is fixed to the surface of a part of the inorganic filler layer 24 from the surface of the positive electrode current collector 22. The first area 26a of the positive electrode active material layer 26 is formed on the surface of the positive electrode current collector 22. The first area 26a is in contact with the surface of the positive electrode current collector 22. The first area 26a has a substantially constant thickness. The average thickness of the first area 26a may be about 10 to 200 μm, typically 20 to 150 μm, for example, 40 to 100 μm. Here, the first area 26a includes the center of the positive electrode active material layer 26 in the width direction Y. The first area 26a has a width Lc1 in the width direction Y.

The second area 26b of the positive electrode active material layer 26 extends from the first area 26a in the Y2 direction. The second area 26b is positioned in the Y2 direction relative to the first area 26a. The second area 26b is formed on the surface of the inorganic filler layer 24. In other words, the second area 26b is laminated on the inorganic filler layer 24. The second area 26b is not in contact with the surface of the positive electrode current collector 22. The second area 26b is formed without a gap directly above the first tapered part 24a along the shape of the first tapered part 24a. The end surface of the second area 26b in the Y2 direction, that is, the surface of the inclined surface S1, is covered with the inorganic filler layer 24. The end surface of the second area 26b in the Y2 direction is not exposed. The thickness of the second area 26b is equal to or less than the average thickness of the first area 26a. Here, the maximum thickness of the second area 26b is equal to the average thickness of the first area 26a. In a cross-sectional view in which the thickness is smaller than that of the main body part, the thickness of the second area 26b continuously increases toward the Y1 direction (toward the end of the positive electrode current collector 22 in the Y1 direction).

The second area 26b has a width Lc2 in the width direction Y. The width Lc2 is a length of a part in which the second area 26b is laminated on the inorganic filler layer 24. Here, the width Lc2 is the same as the width Lh1 of the first tapered part 24a. The width Lc2 is generally shorter than the width Lc1 of the first area 26a. Although not particularly limited, the width Lc2 may be about 10 μm or more, typically 20 to 10,000 μm, for example, 30 to 5,000 μm, or 50 to 1,000 μm, preferably 500 μm or less, for example, 50 to 500 μm, 300 μm or less, 200 μm or less, or 100 μm or less. When the width Lc2 is within the above range, it is possible to effectively minimize elution of metallic elements from the second area 26b, and it is possible to minimize metal deposition on the negative electrode 30 to a large degree. In addition, when the width Lc2 is set to a predetermined value or less, a wide width Lc1 can be secured, and a large battery capacity can be provided.

As shown in FIG. 3, in a cross-sectional view, the positive electrode 20 has a stacking part 28 in which the inorganic filler layer 24 is provided closer to the surface of the positive electrode current collector 22 and the positive electrode active material layer 26 is provided farther from the surface of the positive electrode current collector 22. Here, the stacking part 28 has a structure having two vertical layers. The stacking part 28 has a substantially rectangular cross section. Here, the average thickness of the stacking part 28 is the same as the maximum thickness t of the first tapered part 24a of the inorganic filler layer 24. Here, the average thickness of the stacking part 28 is the same as the maximum thickness of the second area 26b of the positive electrode active material layer 26. The stacking part 28 is formed flush with the first area 26a. The stacking part 28 has a surface that is formed to be flat. Thereby, in the wound electrode body 10, the relative position of the positive electrode active material layer 26 with respect to the negative electrode 30 can be homogenized. In addition, here, the width of the stacking part 28 is the same as the width Lh1 of the first tapered part 24a of the inorganic filler layer 24. Here, the width of the stacking part 28 is the same as the width Lc2 of the second area 26b of the positive electrode active material layer 26.

In the stacking part 28, the composition ratio is inclined in the width direction Y. That is, in the width direction Y, a proportion of the inorganic filler layer 24 and a proportion of the positive electrode active material layer 26 continuously change. In a cross-sectional view, when the entire area of the stacking part 28 is set as 100%, a proportion of the inorganic filler layer 24 may be about 5% or more, for example, 10% or more, or 15% or more, and about 95% or less, for example, 90% or less, or 85% or less. In addition, a proportion of the positive electrode active material layer 26 may be about 5% or more, for example, 10% or more, or 15% or more, and about 95% or less, for example, 90% or less, or 85% or less, of the entire area of the stacking part 28. Thereby, it is possible to effectively minimize elution of metallic elements from the second area 26b and it is possible to suitably realize a large battery capacity.

Here, the positive electrode 20 having the configuration can be produced by a production method including, for example, the following procedures: (Step S1) preparation of a paste for forming a positive electrode active material layer; (Step S2) preparation of a paste for forming an inorganic filler layer; (Step S3) applying and drying the paste; and (Step S4) pressing a positive electrode. Here, (Step S4) is not essential and can be omitted in other embodiments. Hereinafter, description will be provided in order.

In (Step S1), a material such as the positive electrode active material is dispersed in an appropriate solvent (for example, NMP) to prepare a paste for forming a positive electrode active material layer. The paste can be prepared using, for example, a stirring and mixing device such as a ball mill, a roll mill, a planetary mixer, a disper, or a kneader. In this case, the viscosity V1 of the paste for forming a positive electrode active material layer may be adjusted to be within the range of about 3,000 to 20,000 mPa·s, typically 5,000 to 15,000 mPa·s, for example, 7,000 to 10,000 mPa·s, or 7,500 to 8,500 mPa·s. The viscosity V1 can be adjusted, for example, by changing an amount of a solid content (for example, a dispersant or a binder) added with respect to the solvent. Thereby, it is possible to stably and accurately perform Step S3 to be described below. Here, in this specification, the "viscosity" is a value measured at 25° C. using a rheometer at a shear rate of 21.5 s$^{-1}$.

In (Step S2), a material such as the inorganic filler is dispersed in an appropriate solvent (for example, NMP) to prepare a paste for forming an inorganic filler layer. In this case, the viscosity V2 of the paste for forming an inorganic filler layer may be adjusted to be within the range of about 500 to 10,000 mPa·s, typically 700 to 5,000 mPa·s, for example, 1,000 to 3,000 mPa·s, or 1,500 to 2,500 mPa·s. The viscosity V2 can be adjusted, for example, by changing an amount of a solid content (for example, a binder) added with respect to the solvent. Thereby, it is possible to stably and accurately perform Step S3 to be described below. In addition, it is possible to suitably form the inorganic filler layer 24 having a triangular cross section as shown in FIG. 4.

Here, in Step S3 to be described below, when a so-called simultaneous coating method is used, it is necessary to set the viscosity V2 of the paste for forming an inorganic filler layer to be lower than the viscosity V1 of the paste for forming a positive electrode active material layer (low viscosity). Thereby, the contact angle with respect to the positive electrode current collector 22 becomes "paste for forming an inorganic filler layer<paste for forming a positive electrode active material layer" and the paste for forming an inorganic filler layer can be suitably wedged under the paste for forming a positive electrode active material layer. In addition, a ratio (V1/V2) of the viscosity V1 to the viscosity V2 may be adjusted to be within the range of about 5.2 or less, typically 2 to 5, for example, 3 to 4.9. Thereby, it is possible to minimize mixing of two pastes at the boundary part between the positive electrode active material layer 26 and the inorganic filler layer 24, and it is possible to stably discharge the paste in Step S3.

In (Step S3), two types of pastes prepared in Steps S1 and S2 are applied to the positive electrode current collector 22 except for the end of the positive electrode current collector 22 in the Y1 direction. The pastes can be applied using, for example, a coating device such as a die coater, a slit coater, a comma coater, or a gravure coater. In an example, the two types of pastes are applied sequentially in two stages. That is, first, the paste for forming an inorganic filler layer is applied to the positive electrode current collector 22 with a predetermined width Lh except for the exposed part 22a of the positive electrode current collector. Next, the paste for forming a positive electrode active material layer is applied to the positive electrode current collector 22 and the exposed part 22a of the positive electrode current collector with a predetermined width Lc. Alternatively, in another example, the two types of pastes are applied to the positive electrode current collector 22 using a die coater at the same time.

Although not shown, in a preferable aspect, a die coater including a transport mechanism that transports the positive electrode current collector 22 in a transport direction orthogonal to the width direction and a die head from which the two types of pastes are discharged to the positive electrode current collector 22 is prepared. The die head includes a first discharge unit having a first opening through which the paste for forming an inorganic filler layer is discharged and a second discharge unit having a second opening through which the paste for forming a positive electrode active material layer is discharged. The widths of the first opening and the second opening are adjusted so that the positive electrode active material layer 26 and the inorganic filler layer 24 have a predetermined width. For example, in consideration of wet spreadability with respect to the positive electrode current collector 22, the width may be adjusted slightly (for example, about 1% to 2%) smaller than the predetermined width. In addition, in consideration of the wet spreadability, a predetermined interval may be provided between the first opening and the second opening. In addition, in the transport direction, the second discharge unit may be positioned slightly downstream from the first discharge unit. Thereby, the paste for forming an inorganic filler layer can be discharged slightly sooner than the paste for forming a positive electrode active material layer. The first discharge unit, the second discharge unit and the transport mechanism are each electrically connected to a control device. The control device transports the positive electrode current collector 22 in the transport direction and discharges a paste at a predetermined discharge pressure from each of the first discharge unit and the second discharge unit. The positive electrode current collector 22 to which the paste for forming an inorganic filler layer and the paste for forming a positive electrode active material layer are attached may be dried using, for example, a heating dryer.

In (Step S4), press processing is performed on the positive electrode current collector 22 to which the two types of pastes are attached. Thereby, it is possible to adjust properties of the inorganic filler layer 24 and/or the positive electrode active material layer 26, for example, a thickness, a density, and the like. In addition, the maximum thickness of the stacking part 28 and the average thickness of the first area 26a of the positive electrode active material layer 26 can be made uniform. As described above, as shown in FIG. 3, the positive electrode 20 including the inorganic filler layer 24 and the positive electrode active material layer 26 on the positive electrode current collector 22 can be produced.

According to the lithium ion secondary battery 100 having the configuration, supply of electrons to the second area 26b of the positive electrode active material layer 26 is minimized by the inorganic filler layer 24, and a charging and discharging reaction in the second area 26b is minimized. As a result, the second area 26b is less likely to be exposed to a high potential, and it is possible to minimize elution of metallic elements from the second area 26b. Thereby, it is possible to reduce metal deposition (for example, Li deposition) on the facing negative electrode 30.

In addition, in the positive electrode 20, an end of the positive electrode active material layer 26 in the Y2 direction appears on the surface side. Therefore, for example, compared to a conventional positive electrode in which another layer is overlaid on an end of the positive electrode active material layer, it is easy to determine the width of the positive electrode active material layer 26 by image inspection or the like. Therefore, for example, process management when the positive electrode 20 and the negative electrode 30 are overlaid on each other to produce the wound electrode body 10 as shown in FIG. 2 becomes easier. In addition, in a plan view, the end of the positive electrode active material layer 26 in the Y2 direction can be closer to the end of the negative electrode active material layer 36 in the Y2 direction. In addition, it is possible to extend the positive electrode active material layer 26 to a location above the stacking part 28. Together with the operations, the battery capacity can be improved.

While the lithium ion secondary battery 100 can be used for various applications, a high energy density and a large capacity can be realized when the wound electrode body 10 is provided. In addition, when the positive electrode 20 has the configuration, deposition resistance (for example, Li deposition resistance) of a substance derived from charge carriers is improved compared to a conventional product. Therefore, using such a feature, the battery can be suitably used as a drive power supply mounted in vehicles such as an electric vehicle (EV), a hybrid vehicle (HV), and a plug-in hybrid vehicle (PHV).

Here, in the present embodiment, the inorganic filler layer 24 and the positive electrode active material layer 26 are provided on both surfaces of the positive electrode current collector 22. However, the inorganic filler layer 24 and the positive electrode active material layer 26 may be independently provided on only one surface of the positive electrode current collector 22. In this case, the negative electrode active material layer 36 may be provided on only one surface of the negative electrode current collector 32.

In addition, in the present embodiment, the rectangular lithium ion secondary battery 100 including the flat wound electrode body 10 has been described as an example. However, the lithium ion secondary battery can be configured as a lithium ion secondary battery including a lamination type electrode body in which a rectangular positive electrode and negative electrode are laminated in an insulation state. In addition, the lithium ion secondary battery 100 can be configured as a cylindrical form, a lamination form, or the like. In addition, the technology disclosed here can be applied to a non-aqueous electrolyte secondary battery other than the lithium ion secondary battery.

Hereinafter, examples according to the present invention will be described, but the present invention is not intended to be limited to those described in these examples.

Production of Positive Electrode $LiNi_{1/3}Co_{1/3}Mn_{1/3}O_2$ as a positive electrode active material, lithium phosphate ($Li_3PO_4$), polyvinylidene fluoride (PVdF) as a binder, and acetylene black (AB) as a conductive material were mixed in N-methyl-2-pyrrolidone (NMP) to prepare a paste for forming a positive electrode active material layer. In this case, the viscosity V1 of the paste for forming a positive electrode active material layer was adjusted as shown in Table 1. In addition, boehmite as an inorganic filler and polyacrylic acid as a binder were mixed in NMP to prepare a paste for forming an inorganic filler layer. In this case, the viscosity V2 of the paste for forming an inorganic filler layer was adjusted as shown in Table 1.

Next, a band-like aluminum foil was prepared as a positive electrode current collector. Then, the prepared paste for forming a positive electrode active material layer and paste for forming an inorganic filler layer were applied to both surfaces of the aluminum foil at the same time using a die coater including a die head including the first discharge unit and second discharge unit. Then the paste was dried and then pressed. In this manner, positive electrodes having the positive electrode active material layer and the inorganic filler layer and having a stacking part with a width L (Examples 1 to 3, and Comparative Examples 1 to 4) were produced. Here, the paste was applied to the aluminum foil in the longitudinal direction except for the end of the aluminum foil. In addition, the width L of the stacking part was controlled by changing the application width of the inorganic filler layer, in other words, the width of the first opening of the die coater.

Measurement of Inclination Angle θ1

The positive electrodes (Examples 1 to 3, and Comparative Examples 1 to 4) were cut along the width direction and test pieces were cut out. The test pieces were embedded and polished, and the cross sections of the inorganic filler layer and the positive electrode active material layer were then observed using a scanning electron microscope (SEM), and observation images (acceleration voltage: 10 kV, observation magnification: 1,000×) were obtained. Next, the observation images were loaded into image analysis software and binarized according to brightness. Thereby, the boundary (inclined surface) between the inorganic filler layer and the positive electrode active material layer was clarified. Next, a part in which the inorganic filler layer and the positive electrode active material layer had a structure having two vertical layers was cut into a rectangular shape as a stacking part. Then, the width (horizontal distance) of the inorganic filler layer, that is, the width L of the stacking part, and the maximum thickness (a vertical distance from the positive electrode current collector) t were measured. Here, the maximum thickness t of the inorganic filler layer was in a range of 52±4.0 μm in all of the test examples. In addition, the width L was divided by the maximum thickness t to obtain L/t and an inclination angle θ1 of the inclined surface was determined based on a trigonometric function. The results are shown in Table 1.

Production of Lithium Ion Secondary Battery

Natural graphite (C) as a negative electrode active material, styrene butadiene rubber (SBR) as a binder, and carboxymethyl cellulose (CMC) as a thickener were mixed in deionized water to prepare a paste for forming a negative electrode active material layer. Next, a band-like copper foil was prepared as a negative electrode current collector. Then, the negative electrode paste was applied to both surfaces of the copper foil, dried and then pressed. In this manner, a negative electrode including the negative electrode active material layer was produced.

Next, regarding a separator, a porous polyolefin sheet having a three-layer structure of PP/PE/PP in which a polypropylene layer (PP layer) was laminated on both sides of a polyethylene layer (PE layer) was prepared. Then, the produced positive electrode and negative electrode were laminated with the separator therebetween to produce electrode bodies (Examples 1 to 3, and Comparative Examples 1 to 4). Next, the positive electrode current collecting plate was welded to the positive electrode of the produced electrode body and the negative electrode current collecting plate was welded to the negative electrode and they were accommodated in a battery case.

Next, regarding a non-aqueous electrolytic solution, a solution in which $LiPF_6$ with a concentration of 1.0 mol/L as a supporting salt was dissolved in a mixed solvent containing ethylene carbonate (EC), ethyl methyl carbonate (EMC), and dimethyl carbonate (DMC) was prepared. Then, the non-aqueous electrolytic solution was injected into the battery case, and the battery case was hermetically sealed. Thereby, lithium ion secondary batteries (Examples 1 to 3, and Comparative Examples 1 to 4) were produced.

Measurement of Battery Capacity

Constant current charging was performed on the produced lithium ion secondary battery at a rate of ⅓ C until the voltage reached 4.2 V at 25° C., and constant voltage charging was then performed until the current reached 1/50 C. Next, constant current discharging was performed at a rate of 1/3 C until the voltage reached 3.0 V. Here, "1 C" refers to a current value at which a battery capacity (Ah) predicted from a theoretical capacity of a positive electrode active material can be charged in 1 hour. Then, the discharging capacity during constant current discharging was defined as a battery capacity. The battery capacities of Examples 1 to 3 are shown in Table 2. Here, Table 2 shows a relative value when the battery capacity of Example 1 was set as 100%.

Evaluation of Li Deposition Resistance

The lithium ion secondary battery was adjusted to an SOC of 79%, and then put into a constant temperature chamber at −6.7° C., and the temperature was sufficiently stabilized. Then, pulse charging and discharging was repeatedly performed on the lithium ion secondary battery under an environment at −6.7° C. Pulse charging and discharging conditions were as follows: charging was performed at a constant current of 110 A for 5 seconds, and discharging was then performed at a constant current of 110 A for 5 seconds. After high rate pulse charging and discharging, the lithium ion secondary battery was disassembled, the negative electrode was taken out, and it was visually checked whether there was Li deposition on the negative electrode. The results are shown in Table 1. In Table 1, "○" indicates that no deposition was observed, and "×" indicates that deposition was observed.

material layer 126B, and a stacking part 128B. As shown in FIG. 5C, in the electrode body of Comparative Example 3, a positive electrode 120C included an inorganic filler layer 124C, a positive electrode active material layer 126C, and a stacking part 128C. As shown in FIG. 5D, in the electrode body of Comparative Example 4, a positive electrode 120D included an inorganic filler layer 124D, a positive electrode active material layer 126D, and a stacking part 128D. In the positive electrodes of Comparative Examples 1 to 4, in contrast to the positive electrodes of Examples 1 to 3, the ends of the positive electrode active material layers 126A to 126D were overlaid with the inorganic filler layers 124A to 124D, and thereby the stacking parts 128A to 128D were formed. That is, in the positive electrodes of Examples 1 to 3 and the positive electrodes of Comparative Examples 1 to 4, the inclination directions of the inclined surfaces in the stacking parts were opposite to each other.

As shown in Table 1, in Comparative Examples 1 to 4 using the positive electrodes 120A to 120D including the stacking parts 128A to 128D, Li deposition on the negative electrode was observed after high rate pulse charging and discharging without exception. On the other hand, in Examples 1 to 3 using the positive electrode 20 including the stacking part 28, no Li deposition on the negative electrode was observed. Accordingly, it was found that, in the non-aqueous electrolyte secondary battery disclosed here, the

TABLE 1

| Test example | Viscosity of paste (mPa · s)[*1] | | | Stacking part of positive electrode (t = 52 ± 4.0 μm) | | | Evaluation result Li deposition resistance of end of negative electrode |
|---|---|---|---|---|---|---|---|
| | V1 for forming positive electrode active material layer | V2 for forming inorganic filler layer | V1/V2 | L(μm) | L/t | Inclination angle θ1 (°)[*2] | |
| Example 1 | 8,091 | 1,712 | 4.73 | 50 | 0.96 | 46.12 | ○ (no deposition) |
| Example 2 | 8,111 | 2,141 | 3.79 | 100 | 1.92 | 27.47 | ○ (no deposition) |
| Example 3 | 7,989 | 2,464 | 3.24 | 500 | 9.61 | 5.94 | ○ (no deposition) |
| Comparative Example 1 | 8,067 | 1,523 | 5.30 | 50 | 0.96 | −46.12 | x (deposition) |
| Comparative Example 2 | 7,902 | 1,396 | 5.66 | 500 | 9.61 | −5.93 | x (deposition) |
| Comparative Example 3 | 7,963 | 1,304 | 6.11 | 1,000 | 19.23 | −2.98 | x (deposition) |
| Comparative Example 4 | 8,007 | 1,216 | 6.58 | 3,000 | 57.69 | −0.97 | x (deposition) |

[*1] value measured at 25° C. using a rheometer at a shear rate of 21.5 (s$^{-1}$).
[*2] the symbol "−" indicates that an inclination direction of an inclined surface is opposite Here, as a result of SEM observation and the like, electrode bodies of Examples 1 to 3 had a configuration schematically shown in FIG. 3. That is, the positive electrode 20 of Examples 1 to 3 included the inorganic filler layer 24, the positive electrode active material layer 26, and the stacking part 28. In the positive electrodes of Examples 1 to 3, the stacking part 28 in which the inorganic filler layer 24 was overlaid with the positive electrode active material layer 26 was formed.

Figure 5A:
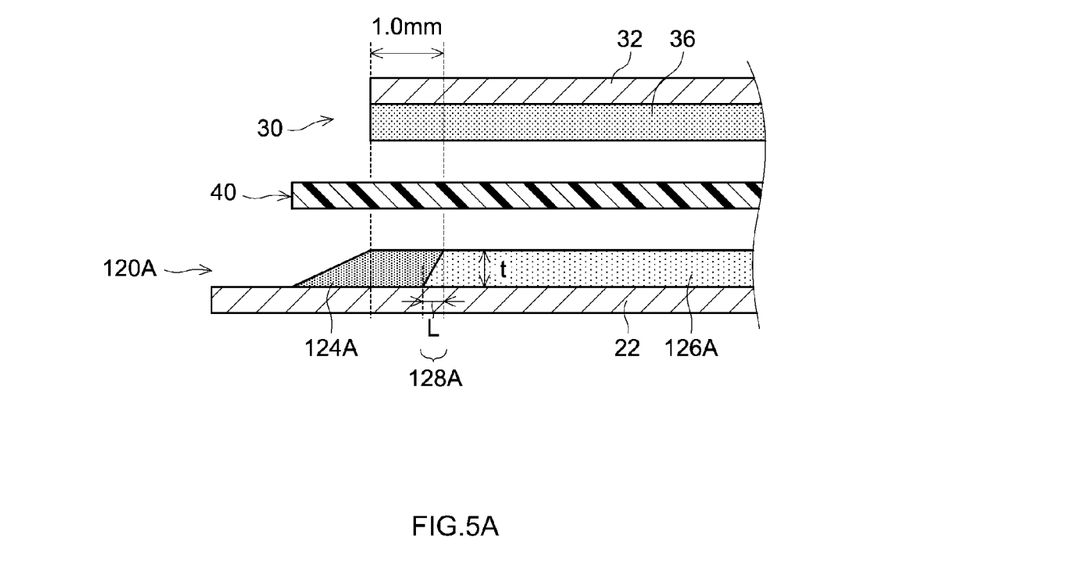
FIG. 5A is a schematic view showing a configuration of an electrode body of Comparative Example 1.
Figure 5B:
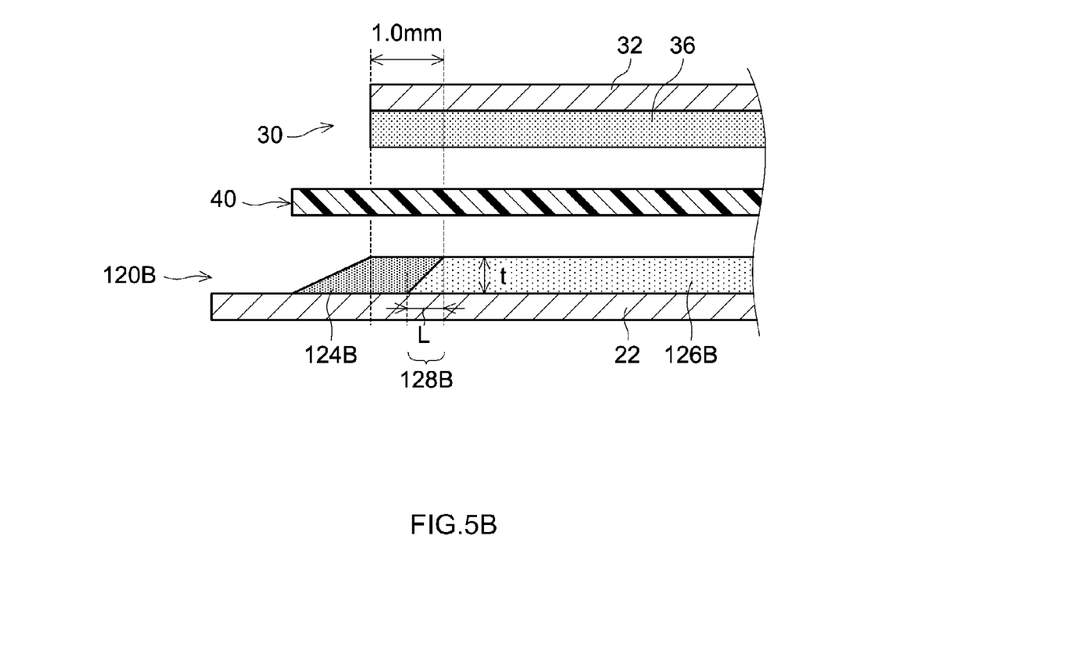
FIG. 5B is a schematic view showing a configuration of an electrode body of Comparative Example 2.
Figure 5C:
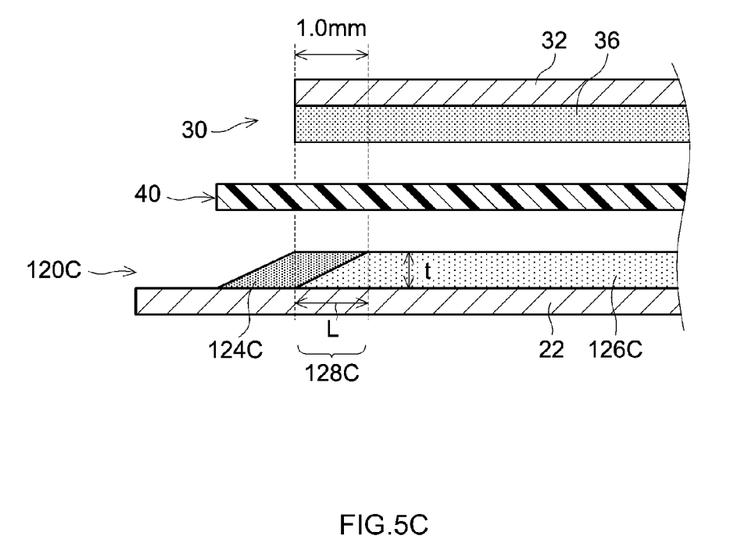
FIG. 5C is a schematic view showing a configuration of an electrode body of Comparative Example 3.
Figure 5D:
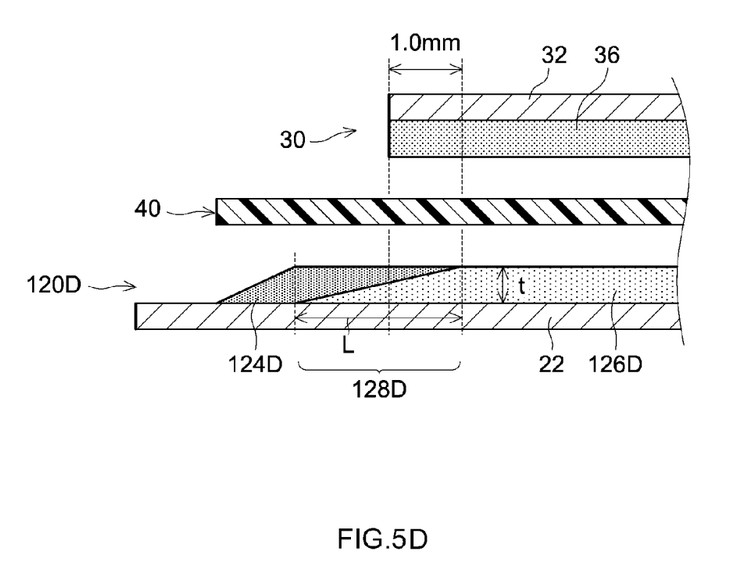
FIG. 5D is a schematic view showing a configuration of an electrode body of Comparative Example 4.

In addition, FIG. 5A to FIG. 5D schematically show configurations at one end of the electrode bodies of Comparative Examples 1 to 4. As shown in FIG. 5A, in the electrode body of Comparative Example 1, a positive electrode 120A included an inorganic filler layer 124A, a positive electrode active material layer 126A, and a stacking part 128A. As shown in FIG. 5B, in the electrode body of Comparative Example 2, a positive electrode 120B included an inorganic filler layer 124B, a positive electrode active occurrence of Li deposition on the negative electrode was minimized, and Li deposition resistance was improved.

TABLE 2

| | Area ratio (%) of stacking part | | Evaluation result Battery capacity |
|---|---|---|---|
| | Inorganic filler layer | Positive electrode active material layer | |
| Example 1 | 82 | 18 | (Reference) |
| Example 2 | 48 | 52 | +0.3% |
| Example 3 | 15 | 85 | +0.7% |

As shown in Table 2, it was possible to improve the battery capacity by increasing a proportion of the positive electrode active material layer in the stacking part. For example, when the width L of the stacking part was set to 500 μm or less, and/or when the inclination angle θ1 was set to 5°≤θ1≤30°, it was possible to effectively minimize elution of Li deposition on the negative electrode, and improve the battery capacity.

While the present invention has been described above in detail, the embodiment and examples are only examples, and the invention disclosed here includes various modifications and alterations of the specific examples.

The terms and expressions used herein are for description only and are not to be interpreted in a limited sense. These terms and expressions should be recognized as not excluding any equivalents to the elements shown and described herein and as allowing any modification encompassed in the scope of the claims. The preferred embodiments disclosed herein may be embodied in many various forms. This disclosure should be regarded as providing preferred embodiments of the principle of the invention. These preferred embodiments are provided with the understanding that they are not intended to limit the invention to the preferred embodiments described in the specification and/or shown in the drawings. The invention is not limited to the preferred embodiment described herein. The invention disclosed herein encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

What is claimed is:

1. A non-aqueous electrolyte secondary battery, comprising:
    a positive electrode;
    a negative electrode that faces the positive electrode; and
    a non-aqueous electrolyte, wherein
    the positive electrode includes
        a positive electrode current collector,
        a positive electrode active material layer which contains a positive electrode active material and is formed on the positive electrode current collector except for a part in which the positive electrode current collector is exposed, and
        an inorganic filler layer which contains an inorganic filler and is formed at a boundary part between the part in which the positive electrode current collector is exposed and the positive electrode active material layer,
    a stacking part in which the inorganic filler layer is overlaid with the positive electrode active material layer is formed at the boundary part, and
    an end surface of the positive electrode active material layer closer to the boundary part is covered with the inorganic filler layer over an entire thickness direction of the positive electrode active material layer.

2. The non-aqueous electrolyte secondary battery according to claim 1, wherein
    the positive electrode active material layer includes a first area fixed to a surface of the positive electrode current collector and a second area which extends from the first area and is fixed to a surface of the inorganic filler layer, and
    in the stacking part, the inorganic filler layer has an inclined surface such that the inorganic filler layer has a thickness continuously decreasing toward the first area of the positive electrode active material layer.

3. The non-aqueous electrolyte secondary battery according to claim 2, wherein an inclination angle of the inclined surface with respect to the positive electrode current collector is 5° or more and 50° or less.

4. The non-aqueous electrolyte secondary battery according to claim 1, wherein the stacking part has a width of 500 μm or less in a direction from the positive electrode active material layer toward the inorganic filler layer.

5. The non-aqueous electrolyte secondary battery according to claim 1, wherein a surface of a part of the stacking part facing the negative electrode is formed to be flat.

6. The non-aqueous electrolyte secondary battery according to claim 1, wherein
    the inorganic filler layer includes a first part which is overlaid with the positive electrode active material layer and a second part which is provided closer to the part in which the positive electrode current collector is exposed than the first part and which is not overlaid with the positive electrode active material layer, and
    the second part protrudes in a direction relative to an end of a negative electrode material layer in plan view.

7. The non-aqueous electrolyte secondary battery according to claim 1, wherein
    the positive electrode active material layer includes a first area fixed to a surface of the positive electrode current collector and a second area which extends from the first area and is fixed to a surface of the inorganic filler layer, and
    the stacking part is formed flush with the first area of the positive electrode active material layer.

8. The non-aqueous electrolyte secondary battery according to claim 1, wherein
    the inorganic filler layer directly contacts the end surface of the positive electrode active material layer over the entire thickness direction of the positive electrode active material layer.

* * * * *